United States Patent
Kumar et al.

(10) Patent No.: US 10,091,247 B2
(45) Date of Patent: *Oct. 2, 2018

(54) APPARATUS AND METHOD FOR USING CERTIFICATE DATA TO ROUTE DATA

(71) Applicant: 128 Technology, Inc., Burlington, MA (US)

(72) Inventors: Prashant Kumar, Andover, MA (US); Patrick Timmons, Newton, MA (US); Patrick J. McLampy, Dunstable, MA (US)

(73) Assignee: 128 Technology, Inc., Burlington, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/671,744

(22) Filed: Aug. 8, 2017

(65) Prior Publication Data

US 2017/0339194 A1 Nov. 23, 2017

Related U.S. Application Data

(63) Continuation of application No. 14/660,500, filed on Mar. 17, 2015, now Pat. No. 9,736,184.

(51) Int. Cl.
*H04L 29/06* (2006.01)
*H04L 12/741* (2013.01)

(52) U.S. Cl.
CPC ............. *H04L 63/20* (2013.01); *H04L 45/74* (2013.01); *H04L 63/0823* (2013.01); *H04L 63/166* (2013.01)

(58) Field of Classification Search
None
See application file for complete search history.

(56) References Cited

U.S. PATENT DOCUMENTS

| 4,975,865 A | 12/1990 | Carrette et al. |
| 6,243,747 B1 | 6/2001 | Lewis et al. |

(Continued)

FOREIGN PATENT DOCUMENTS

| CN | 101552703 A | 10/2009 |
| CN | 101646220 A | 2/2010 |

(Continued)

OTHER PUBLICATIONS

Berners-Lee, et al., *Uniform Resource Identifier (URI): Generic Syntax*, Network Working Group, Request for Comments 3986, The Internet Society, 61 pages, Jan. 2005.

(Continued)

*Primary Examiner* — Amir Mehrmanesh
(74) *Attorney, Agent, or Firm* — Sunstein Kann Murphy & Timbers LLP

(57) ABSTRACT

A method of routing data across a network receives a session request from a client node to access at least one node in a local network having a plurality of nodes. The method also receives a client certificate (e.g., a digital certificate at least partially specified by known standards, such as the "X509 Standard") from the client node. The client certificate has client information specifying at least one node to receive packets from the client node. Next, the method uses the client certificate to execute an authentication process. If the authentication process authenticates the client node, then the method routes data packets from the client node to at least one node in the local network as specified by the client information in the client certificate.

47 Claims, 7 Drawing Sheets

(56) References Cited

U.S. PATENT DOCUMENTS

| | | |
|---|---|---|
| 6,515,963 B1 | 2/2003 | Bechtolsheim et al. |
| 6,563,824 B1 | 5/2003 | Bhatia et al. |
| 6,584,071 B1 | 6/2003 | Kodialam et al. |
| 6,687,220 B1 | 2/2004 | Ayres |
| 6,721,334 B1 | 4/2004 | Ketcham |
| 6,738,387 B1 | 5/2004 | Lin et al. |
| 6,778,531 B1 | 8/2004 | Kodialam et al. |
| 6,798,743 B1 | 9/2004 | Ma et al. |
| 7,020,143 B2 | 3/2006 | Zdan |
| 7,035,214 B1 | 4/2006 | Seddigh et al. |
| 7,106,739 B2 | 9/2006 | Beier |
| 7,150,037 B2 | 12/2006 | Wolf et al. |
| 7,154,902 B1 | 12/2006 | Sikdar |
| 7,218,632 B1 | 5/2007 | Bechtolsheim et al. |
| 7,315,541 B1 | 1/2008 | Housel et al. |
| 7,373,660 B1 | 5/2008 | Guichard et al. |
| 7,466,703 B1 | 12/2008 | Arunachalam et al. |
| 7,536,720 B2 | 5/2009 | Burdett et al. |
| 7,558,847 B2 | 7/2009 | Strassner |
| 7,634,805 B2 | 12/2009 | Aroya |
| 7,706,411 B2 | 4/2010 | Wakumoto et al. |
| 7,730,301 B2 | 6/2010 | Correll et al. |
| 7,773,611 B2 | 8/2010 | Booth, III et al. |
| 7,872,973 B2 | 1/2011 | Sterne et al. |
| 8,068,417 B1 | 11/2011 | Roberts |
| 8,094,560 B2 | 1/2012 | Bagepalli et al. |
| 8,139,479 B1 | 3/2012 | Raszuk |
| RE44,119 E | 4/2013 | Wang et al. |
| 8,437,248 B2 | 5/2013 | Li et al. |
| 8,527,641 B2 | 9/2013 | Degaonkar et al. |
| 8,570,893 B2 | 10/2013 | Guo et al. |
| 8,584,199 B1 | 11/2013 | Chen et al. |
| 8,634,428 B2 | 1/2014 | Le Pennec et al. |
| 8,804,489 B2 | 8/2014 | Lu et al. |
| 8,832,241 B2 | 9/2014 | Mithyantha |
| 8,942,085 B1 | 1/2015 | Pani et al. |
| 8,989,020 B2 | 3/2015 | So |
| 9,059,920 B2 | 6/2015 | Ravindran et al. |
| 9,160,652 B2 | 10/2015 | Taillon et al. |
| 9,240,953 B2 | 1/2016 | Carlstrom |
| 9,276,864 B1 | 3/2016 | Vincent |
| 9,729,439 B2 | 8/2017 | MeLampy et al. |
| 9,729,682 B2 | 8/2017 | Kumar et al. |
| 9,736,184 B2 | 8/2017 | Kumar et al. |
| 2001/0030649 A1 | 10/2001 | Mamiya et al. |
| 2002/0044553 A1 | 4/2002 | Chakravorty |
| 2002/0075883 A1 | 6/2002 | Dell et al. |
| 2002/0150041 A1 | 10/2002 | Reinshmidt et al. |
| 2002/0176363 A1 | 11/2002 | Durinovic-Johri et al. |
| 2003/0081624 A1 | 5/2003 | Aggarwal et al. |
| 2003/0191857 A1 | 10/2003 | Terrell et al. |
| 2003/0198189 A1 | 10/2003 | Roberts et al. |
| 2003/0214938 A1 | 11/2003 | Jindal et al. |
| 2004/0014467 A1 | 1/2004 | O'Neill et al. |
| 2004/0088542 A1 | 5/2004 | Daude et al. |
| 2004/0264481 A1 | 12/2004 | Darling et al. |
| 2005/0013300 A1 | 1/2005 | Akahane et al. |
| 2005/0018618 A1 | 1/2005 | Mualem et al. |
| 2005/0036616 A1 | 2/2005 | Huang et al. |
| 2005/0063307 A1 | 3/2005 | Samuels et al. |
| 2005/0182932 A1 | 8/2005 | Wheeler |
| 2005/0213570 A1 | 9/2005 | Stacy et al. |
| 2005/0238022 A1 | 10/2005 | Panigrahy |
| 2005/0249206 A1 | 11/2005 | Wybenga et al. |
| 2006/0045014 A1 | 3/2006 | Charzinski |
| 2006/0176894 A1 | 8/2006 | Oh et al. |
| 2007/0171825 A1 | 7/2007 | Roberts et al. |
| 2007/0171826 A1 | 7/2007 | Roberts et al. |
| 2008/0214175 A1 | 9/2008 | Papadoglou et al. |
| 2008/0259938 A1 | 10/2008 | Keene et al. |
| 2009/0007021 A1 | 1/2009 | Hayton |
| 2009/0059958 A1 | 3/2009 | Nakata |
| 2009/0086651 A1 | 4/2009 | Luft et al. |
| 2010/0125898 A1 | 5/2010 | Dubuc et al. |
| 2010/0191968 A1 | 7/2010 | Patil et al. |
| 2011/0299554 A1 | 12/2011 | Ros-Giralt et al. |
| 2012/0144061 A1 | 6/2012 | Song |
| 2012/0236860 A1 | 9/2012 | Kompella et al. |
| 2013/0227166 A1 | 8/2013 | Ravindran et al. |
| 2013/0297824 A1 | 11/2013 | Lan et al. |
| 2014/0040488 A1 | 2/2014 | Small et al. |
| 2014/0115688 A1 | 4/2014 | Zuk et al. |
| 2014/0177639 A1 | 6/2014 | Vershkov et al. |
| 2015/0188814 A1 | 7/2015 | Jain et al. |
| 2015/0229618 A1 | 8/2015 | Wan et al. |
| 2015/0381324 A1 | 12/2015 | Mirsky et al. |
| 2016/0094444 A1 | 3/2016 | MeLampy et al. |
| 2016/0164780 A1 | 6/2016 | Timmons et al. |

FOREIGN PATENT DOCUMENTS

| | | |
|---|---|---|
| CN | 101068242 B | 4/2010 |
| CN | 102158371 A | 8/2011 |
| CN | 101640629 B | 8/2012 |
| CN | 102739507 A | 10/2012 |
| CN | 101207604 B | 3/2013 |
| CN | 102769679 B | 6/2015 |
| CN | 103179192 B | 11/2015 |
| CN | 105245469 A | 1/2016 |
| EP | 0 765 522 B1 | 5/2004 |
| EP | 1 313 267 B1 | 12/2006 |
| EP | 2 541 848 A1 | 1/2013 |
| KR | 10-2011-0062994 A | 6/2011 |
| WO | WO 2007/084707 A2 | 7/2007 |
| WO | WO 2007/084755 A2 | 7/2007 |
| WO | WO 2008/043230 A1 | 4/2008 |
| WO | WO 2015/131537 A1 | 9/2015 |
| WO | WO 2016/007052 A1 | 1/2016 |

OTHER PUBLICATIONS

Bjorklund, *YANG—A Data Modeling Language for the Network Configuration Protocol (NETCONF)*, Internet Engineering Task Force (IETF), Request for Comments 6020, ISSN: 2070-1721, 173 pages, Oct. 2010.

CAIDA, *Observing routing asymmetry in Internet traffic*, (www.caida.org/research/traffic-analysis/asymmetry/1), 7 pages, dated Jul. 17, 2013.

Chiosi, et al., *Network Functions Virtualisation—Introductory White Paper*, Issue 1, at the "SDN and OpenFlow World Congress," Darmstadt-Germany, (http://portal.etsi.org/nfv/nfv_white_paper), 16 pages, dated Oct. 22, 2012.

Cisco Systems, *Parallel Express Forwarding on the Cisco 10000 Series*, (White Paper) Cisco Systems, printed Jun. 17, 2015, 4 pages.

Data Plane Development Kit, *Programmer's Guide, Release 16.04.0*, 216 pages, Apr. 12, 2016.

Davis, *Layer 3 Switches Explained*, Happy Router, 6 pages, dated Aug. 30, 2007.

Filsfils, et al., *Segment Routing Architecture*, Network Working Grroup, Draft, 28 pages, Oct. 21, 2013.

Hansson, et al., *A Unified Approach to Constrained Mapping and Routing on Network-on-Chip Architectures*, CODES+ISSS '05 Proceedings of the 3rd IEEE/ACM/IFIP International Conference on Hardware/Software Codesign and System Synthesis, 6 pages, Sep. 19-21, 2005.

Herbert, *xps: Transmit Packet Steering*, Eklektix, Inc., Oct. 26, 2010, 11 pages.

IANA, *Transmission Control Protocol (TCP) Parameters*, (www.iana.org/assignments/tcp-parameters/tcp-parameters.xhtm), 5 pages, dated Sep. 22, 2014.

Iyer, *Load Balancing and Parallelism for the Internet*, A Dissertation submitted to the Dept. of Computer Science and the Committee on Graduate Studies of Stanford University in Partial Fulfillment of the Requirements for the Degree of Doctor of Philosophy, retrieved on the Internet at http://yuba.stanford.edu/~sundaes/Dissertation/sundar_thesis.pdf, 436 pages, Jul. 2008.

Jamjoom, et al., *Persistent Dropping: An Efficient Control of Traffic Aggregates*, https://cs.uwaterloo.ca/~brecht/servers/readings-new/jamjoon-sigcomm-2003.pdf, SIGCOMM'03, 12 pages, 2003.

(56) References Cited

OTHER PUBLICATIONS

Katz, et al., *Bidirectional Forwarding Detection (BFD)*, Internet Engineering Task Force (IETF), Request for Comments 5880, ISSN: 2070-1721, Juniper Networks, 49 pages, Jun. 2010.
Klement, *1.2 Overview of a TCP communications session*, RPG IV Socket Tutorial (http://www.scottklement.com/rpg/socketut/overview), 2 pages, 2001.
Kumar, et al., *Comparison of Queuing Algorithms against DDoS Attack*, https://pdfs.semanticscholar.org/d3d6/15bf0094e7564a57267c34683aa5e590e4ed.pdf, International Journal of Computer Science and Information Technologies, vol. 2 (4), pp. 1574-1580, 2011.
Microsoft, *Introduction to Receive Side Scaling*, Developer Resources, https://msdn.microsoft.com/en-us/library/windows/hardware/ff556942(v=vs.85).aspx, 3 pages, Apr. 2014.
Microsoft, *RSS with a Single Hardware Receive Queue*, Developer Resources, https://msdn.microsoft.com/en-us/library/windows/hardware/ff570727(v=vs.85).aspx, 2 pages, Jan. 2015.
Microsoft, *RSS with Hardware Queuing*, Developer Resources, https://msdn.microsoft.com/en-us/library/windows/hardware/ff570728(v=vs.85).aspx, 2 pages, Jan. 2015.
Microsoft, *Non-RSS Receive Processing*, Developer Resources, https://msdn.microsoft.com/en-us/library/windows/hardware/ff568798(v=vs.85).aspx, 2 pages, Jan. 2015.
PC Magazine Encyclopedia, *Definition of TCP/IP abc's*, PC Magazine Encyclopedia (www.pcmag.com/encyclopedia/term/52615), 5 pages, 2005.
Previdi, et al., *IPv6 Segment Routing Header (SRH)*, Network working Group, Draft, 24 pages, Jul. 3, 2014.
Roberts, *The Next Generation of IP—Flow Routing*, SSGRR 2003S International Conference, L'Aquila Italy, 11 pages, Jul. 29, 2003.
Rouse, *What is routing table?*, Posted by Margaret Rouse (http://searchnetworking.techtarget.com/definition/routing-table), 5 pages, Apr. 2007.
Shang, et al., *Making Better Use of All Those TCP ACK Packets*, Computer Science Department, Worcester Polytechnic Institute, 10 pages, 2005.
Shaw, *Multi-queue network interfaces with SMP on Linux*, Greenhost, https://greenhost.net/2013/04/10/multi-queue-network-interfaces-with-smp-on-linux/, 5 pages, Apr. 10, 2013.
Sollins, et al., *Functional Requirements for Uniform Resource Names*, Network Working Group, Request for Comments 1737, 7 pages, Dec. 1994.
Srinivasan, et al., *A Technique for Low Energy Mapping and Routing in Network-on-Chip Architectures*, ISLPED '05 Proceedings of the 2005 International Symposium on Low Power Electronics and Design, 6 pages, Aug. 8-10, 2005.
Wikipedia, *LAN switching*, 5 pages, dated Jun. 12, 2013.
Wikipedia, *Management information base*, 6 pages, dated Jul. 15, 2013.
Wikipedia, *Reverse path forwarding*, 3 pages, dated Jul. 31, 2013.
Wikipedia, *Equal-cost multi path routing*, 1 page, dated Sep. 12, 2013.
Wikipedia, *Transmission Control Protocol*, 18 pages, dated Sep. 16, 2013.
Wikipedia, *Software-defined networking*, 6 pages, dated Sep. 16, 2013.
Wikipedia, *Network socket*, 4 pages, dated Sep. 19, 2013.
Wikipedia, *Router (computing)*, 8 pages, dated Sep. 23, 2013.
Wikipedia, *Network address translation*, 11 pages, dated Sep. 24, 2013.
Wikipedia, *Open vSwitch*, 2 pages, dated Nov. 24, 2013.
Wikipedia, *Active queue management*, https://en.wikipedia.org/wiki/Active_queue_management, 2 pages, Apr. 22, 2015.
Wikipedia, *Network interface controller*, https://en.wikipedia.org/wiki/Network_interface_controller, 5 pages, May 19, 2015.
International Searching Authority, International Search Report—International Application No. PCT/2015/044815, dated Dec. 6, 2015, together with the Written Opinion of the International Searching Authority, 8 pages.
International Searching Authority, International Search Report—International Application No. PCT/2015/060840, dated Mar. 8, 2016, together with the Written Opinion of the International Searching Authority, 13 pages.
International Searching Authority, International Search Report—International Application No. PCT/US2016/013416, dated Jun. 8, 2016, together with the Written Opinion of the International Searching Authority, 12 pages.
International Searching Authority, International Search Report—International Application No. PCT/US2016/026938, dated Jul. 28, 2016, together with the Written Opinion of the International Searching Authority, 9 pages.
International Searching Authority, International Search Report—International Application No. PCT/US2016/062033, dated Mar. 7, 2017, together with the Written Opinion of the International Searching Authority, 10 pages.
International Searching Authority, International Search Report—Application No. PCT/US2017/016984, dated May 18, 2017, together with the Written Opinion of the International Searching Authority, 10 pages.
International Searching Authority, International Search Report—Application No. PCT/US2017/032907, dated Aug. 3, 2017, together with the Written Opinion of the International Searching Authority, 8 pages.
Israel Patent Office, International Search Report, International Application No. PCT/US2017/027169, together with the Written Opinion of the International Searching Authority, 13 pages, dated Jul. 13, 2017.
Israel Patent Office, International Search Report, International Application No. PCT/US2017/027166, together with the Written Opinion of the International Searching Authority, dated Jul. 18, 2017, 8 pages.
International Searching Authority, International Search Report—International Application No. PCT/US2017/029399, dated Aug. 14, 2017, together with the Written Opinion of the International Searching Authority, 9 pages.
International Searching Authority, International Search Report—International Application No. PCT/US2017/030184, dated Aug. 6, 2017, together with the Written Opinion of the International Searching Authority, 10 pages.

Certificate:

Data:

Version: 3 (0x2)

Serial Number: 4100 (0x1004)

Signature Algorithm: sha256WithRSAEncryption

Issuer: C=US, ST=MA, L=Burlington, O=128 Technology, OU=ENG, CN=128/emailAddress=admin@128technology.com Validity Not Before: Nov 24 22:09:43 2014 GMT Not After: Nov 21 22:09:43 2024 GMT Subject: C=US, ST=MA, O=128 Technology, OU=ENG, CN=John Smith/emailAddress=smith@128technology.com Subject Public Key Info:

Public Key Algorithm: rsaEncryption

Public-Key: (1024 bit)

Modulus:

00:b1:8d:04:40:13:ed:09:7e:c9:0b:fe:ea:da:6d:

7d:58:1a:3a:2e:be:54:a1:8a:d6:23:8a:df:36:2f:

9e:ea:92:c4:4b:fb:2c:c7:6e:3c:66:ed:54:97:64:

cd:2f:24:2d:b3:d0:eb:c1:20:99:4d:b5:8d:37:87:

b3:0a:ef:f3:23:de:ce:ff:33:20:79:7e:95:9c:f0:

65:ec:08:1f:a3:a4:f3:06:4c:4d:4e:75:40:79:d1:

24:73:04:5f:43:0c:f8:df:d8:40:c9:50:0b:5e:28:

cb:9a:55:e2:6a:61:10:42:4d:46:aa:2f:0c:b1:e4:

e4:b0:73:f9:c7:be:d4:42:df

Exponent: 65537 (0x10001)

*FIG. 7A*

X509v3 extensions:

X509v3 Basic Constraints:

CA:FALSE

X509v3 Key Usage:

Digital Signature, Non Repudiation, Key Encipherment

<u>X509v3 Certificate Policies:</u>

<u>Policy: 1.2.3.4.5</u>

<u>Policy: 1.2.3.4.6</u>

Netscape Comment:

OpenSSL Generated Certificate

X509v3 Subject Key Identifier:

58:3F:BF:26:5A:52:A3:B0:F8:2B:B0:72:35:65:2I:0D:9B:BD:20:74

X509v3 Authority Key Identifier:

keyid:9E:70:74:D8:AE:52:A2:07:2A:99:B0:DD:3F:DC:50:DA:72:BD:21:81

Signature Algorithm: sha256WithRSAEncryption

APPARATUS AND METHOD FOR USING CERTIFICATE DATA TO ROUTE DATA

RELATED APPLICATIONS

This patent application is a continuation of U.S. patent application Ser. No. 14/660,500, filed Mar. 17, 2015, entitled "APPARATUS AND METHOD FOR USING CERTIFICATE DATA TO ROUTE DATA" (now U.S. Pat. No. 9,736,184, issued Aug. 15, 2017), the contents of which is incorporated herein, in its entirety, by reference, for all purposes.

This patent application is related to U.S. patent application Ser. No. 14/497,954, filed Sep. 26, 2014, entitled "NETWORK PACKET FLOW CONTROLLER" (now U.S. Pat. No. 9,729,439, issued Aug. 8, 2017), the disclosure of which is incorporated herein, in its entirety, by reference, for all purposes.

This patent application also is related to U.S. patent application Ser. No. 14/562,917, filed Dec. 8, 2014, entitled "STATEFUL LOAD BALANCING IN A STATELESS NETWORK" (published as United States patent application publication number US 2016/0164780 on Jun. 9, 2016), the disclosure of which is incorporated herein, in its entirety, by reference, for all purposes.

FIELD OF THE INVENTION

The invention generally relates to network devices and, more particularly, the invention relates to security for network routing devices

BACKGROUND OF THE INVENTION

The Internet Protocol ("IP") serves as the de-facto standard for forwarding data messages ("datagrams") between network devices connected with the Internet. To that end, IP delivers datagrams across a series of Internet devices, such as routers and switches, in the form of one or more data packets. Each packet has two principal parts: (1) a payload with the information being conveyed (e.g., text, graphic, audio, or video data), and (2) a header, known as an "IP header," having the address of the network device to receive the packet(s) (the "destination device"), the identity of the network device that sent the packet (the "originating device"), and other data for routing the packet. Many people thus analogize packets to a traditional letter using first class mail, where the letter functions as the payload, and the envelope, with its return and mailing addresses, functions as the IP header.

Hackers frequently attempt to access and illicitly manipulate third-party Internet devices, such as application servers in data centers. Such breaches can compromise massive amounts of data, leading to rampant fraud costing billions of dollars.

SUMMARY OF VARIOUS EMBODIMENTS

In accordance with one embodiment of the invention, a method of routing data across a network receives a session request from a client node to access at least one node in a local network having a plurality of nodes. The method also receives a client certificate (e.g., a digital certificate at least partially specified by known standards, such as the "X509 Standard") from the client node. The client certificate has client information specifying at least one node to receive packets from the client node. Next, the method uses the client certificate to execute an authentication process. If the authentication process authenticates the client node, then the method routes data packets from the client node to at least one node in the local network as specified by the client information in the client certificate.

If the authentication process cannot authenticate the client node, then the method may reject the client node. For example, the method may effectively block packets of the client node from access to other nodes in the local network (i.e., the method simply may not forward packets it receives from the client node).

Illustrative embodiments route the data packets by using the client information to determine the identity of the at least one node in the local network to receive the data packets. Routing thus is considered to permit client node access to the at least one node.

Among other things, the client information may include a) identifying information identifying the client node, b) policy information for enabling a set of privileges for the client node when accessing the at least one node in the local network, or both the identifying information and policy information Data packets thus may be routed as specified by one or both the identifying information and the policy information.

The local network (e.g., a local area network) may have an edge router that receives the session request, receives the client certificate, retrieves the client information, and/or routes the data packets. The local network also may include a number of other nodes. For example, the at least one node may include an application server.

The virtual connection formed by routing may use a number of different approaches. For example, the virtual connection may maintain a static connection between a receiving node of the local network receiving the session request, and the at least one node in the local network. This static connection is within the local network only. In that case, routing may include routing data packets from the client along the static connection. Accordingly, in such embodiments, well-known handshake processes are not expected to be performed between the client node and the at least one node in the local network during the session.

Other embodiments, however, may not use the noted static connection. For example, the method may permit initial handshake processes between the client node and the at least one node before receiving the certificate, and permit completion of final handshake processes between the client node and at least one node if the authentication process authenticates the client node.

Among other things, the authentication process may receive a login ID and password for a guest user, and confirm that the login ID and password are valid for access in the local network. Some embodiments may determine a client device identifier (e.g., the MAC address of the client device) that identifies the client node device, and use the client device identifier and the client certificate to execute the authentication process.

In accordance with another embodiment, a network routing device for routing data received across a network has an interface for receiving a) a session request from a client node to access at least one node in a local network having a plurality of nodes, and b) a client certificate from the client node. The client certificate has client information specifying at least one node to receive packets from the client node. The network routing device also has an authenticator, operatively coupled with the interface, configured to retrieve the client information from the client certificate and execute an authentication process using the client information. In addition, the network routing device further has a router, operatively coupled with the authenticator, configured to determine, from the authenticator, if the authentication process authenticated the client node. The router thus is configured to route data packets from the client node to at least one node in the local network as specified by the client information in the client certificate if the client node is authenticated.

In accordance with still other embodiments, a method of routing data across a network receives a session request from a client node to access at least one node in a local network having a plurality of nodes, and receives a client certificate from the client node. The client certificate has client information specifying at least one node to receive packets from the client node. The method retrieves the client information from the client certificate, and facilitates at least limited access to the at least one node based on the client information in the client certificate.

Illustrative embodiments of the invention are implemented as a computer program product having a computer usable medium with computer readable program code thereon. The computer readable code may be read and utilized by a computer system in accordance with conventional processes.

BRIEF DESCRIPTION OF THE DRAWINGS

Those skilled in the art should more fully appreciate advantages of various embodiments of the invention from the following "Description of Illustrative Embodiments," discussed with reference to the drawings summarized immediately below.

FIGS. 7A and 7B show an example of a digital certificate produced in accordance with illustrative embodiments of the invention.

DESCRIPTION OF ILLUSTRATIVE EMBODIMENTS

In illustrative embodiments, a network device locally routes incoming data messages from a remote client based upon client specific information within the client's digital certificate. To that end, the client's digital certificate has additional information, such as information identifying the identity of the client, and policies/permissions of that specific client when accessing certain devices in the local network of the routing network device.

Accordingly, after validating/authenticating the client, the network device routes client packets within its local network (e.g., its local area network) as a function of the client information in the client digital certificate. The client therefore can access pre-selected network devices only as specified by the client information in the digital certificate. In addition, the client only has certain privileges on those pre-selected network devices based upon the policy information within the client certificate. Details of illustrative embodiments are discussed below.

Networks

Illustrative embodiments preferably are implemented on a conventional computer network. Among other things, a network includes at least two nodes and at least one link between the nodes. Nodes can include computing devices (sometimes referred to as hosts or devices) and routers. Computers may include personal computers, smart phones, television "cable boxes," automatic teller machines (ATMs) and many other types of equipment that include processors and network interfaces. Links include wired and wireless connections between pairs of nodes. In addition, nodes and/or links may be implemented completely in software, such as in a virtual machine, a software defined network, and using network function virtualization. Many networks include switches, which are largely transparent for purposes of this discussion. However, some switches also perform routing functions. For the present discussion, such routing switches are considered routers. Routers are described below.

Figure 1:
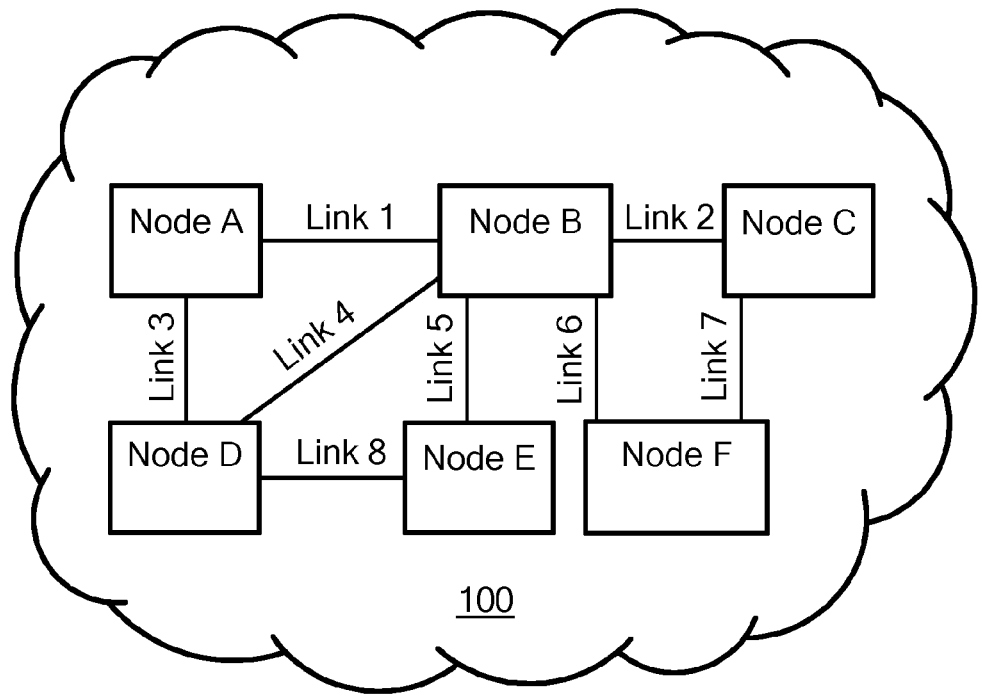
FIG. 1 schematically shows a hypothetical prior art network that may use illustrative embodiments of the invention.

A node can be directly connected to one or more other nodes, each via a distinct link. For example, FIG. 1 schematically shows a Node A directly connected to Node B via Link 1. In a given network (e.g., within a local area network), each node has a unique network address to facilitate sending and receiving data. A network includes all the nodes addressable within the network according to the network's addressing scheme, and all the links that interconnect the nodes for communication according to the network's addressing scheme. For example, in FIG. 1, Node A, Node B, Node C, . . . Node F and all the links 1-8 together make up a network 100. For simplicity, a network may be depicted as a cloud or as being enclosed within a cloud. Absence of a cloud, however, does not mean a collection of nodes and links are not a network. For example, a network may be formed by a plurality of smaller networks.

Nodes can initiate communications with other nodes via the network, and nodes can receive communications initiated by other nodes via the network. For example, a node may transmit/forward/send data (a message) to a directly connected (adjacent) node by sending the message via the link that interconnects the adjacent nodes. The message includes the network address of the sending node (the "source address") and the network address of the intended receiving node (the "destination address"). A sending node can send a message to a non-adjacent node via one or more other intervening nodes. For example, Node D may send a message to Node F via Node B. Using well known networking protocols, the node(s) between the source and the destination forward the message until the message reaches its destination. Accordingly, to operate properly, network protocols enable nodes to learn or discover network addresses of non-adjacent nodes in their network.

Nodes communicate via networks according to protocols, such as the well-known Internet Protocol (IP) and Transmission Control Protocol (TCP). The protocols are typically implemented by layered software and/or hardware components, such as according to the well-known seven-layer Open System Interconnect (OSI) model. As an example, IP operates at OSI Layer 3 (Network Layer), while the TCP operates largely at OSI Layer 4 (Transport Layer). Each layer performs a logical function and abstracts the layer below it, therefore hiding details of the lower layer.

Figure 2:
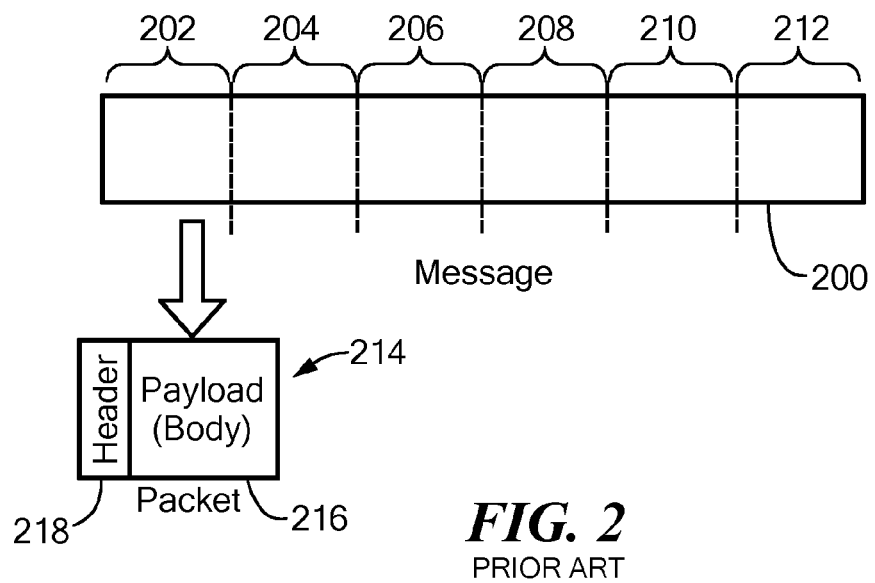
FIG. 2 schematically shows a fragmentation of a prior art message that may be used with illustrative embodiments of the invention.

For example, Layer 3 may fragment a large message into smaller packets if Layer 2 (Data Link Layer) cannot handle the message as one transmission. FIG. 2 schematically illustrates a large message 200 divided into several pieces 202, 204, 206, 208, 210 and 212. Each piece 202-212 may then be sent in a separate packet, exemplified by packet 214. Each packet includes a payload (body) portion, exemplified by payload 216, and a header portion, exemplified at 218. The header portion 218 contains information, such as the packet's source address, destination address and packet sequence number, necessary or desirable for: 1) routing the packet to its destination, 2) reassembling the packets of a message, and 3) other functions provided according to the protocol. In some cases, a trailer portion is also appended to the payload, such as to carry a checksum of the payload or of the entire packet. All packets of a message need not be sent along the same path, i.e., through the same nodes, on their way to their common destination. It should be noted that although IP packets are officially called IP datagrams, they are commonly referred to simply as packets.

Some other protocols also fragment data into packets. For example, the TCP fragments data into segments, officially referred to as TCP protocol data units (PDUs). Nevertheless, in common usage, the term packet is used to refer to PDUs and datagrams, as well as Ethernet frames.

Most protocols encapsulate packets of higher level protocols. For example, IP encapsulates a TCP packet by adding an IP header to the TCP packet to produce an IP packet. Thus, packets sent at a lower layer can be thought of as being made up of packets within packets. Conventionally, a component operating according to a protocol examines or modifies only information within a header and/or trailer that was created by another component, typically within another node, operating according to the same protocol. That is, conventionally, components operating according to a protocol do not examine or modify portions of packets created by other protocols.

In another example of abstraction provided by layered protocols, some layers translate addresses. Some layers include layer-specific addressing schemes. For example, each end of a link is connected to a node via a real (e.g., electronic) or virtual interface, such as an Ethernet interface. At Layer 2 (Data Link Layer), each interface has an address, such as a media access control (MAC) address. On the other hand, at Layer 3 using IP, each interface, or at least each node, has an IP address. Layer 3 converts IP addresses to MAC addresses.

Figure 3:
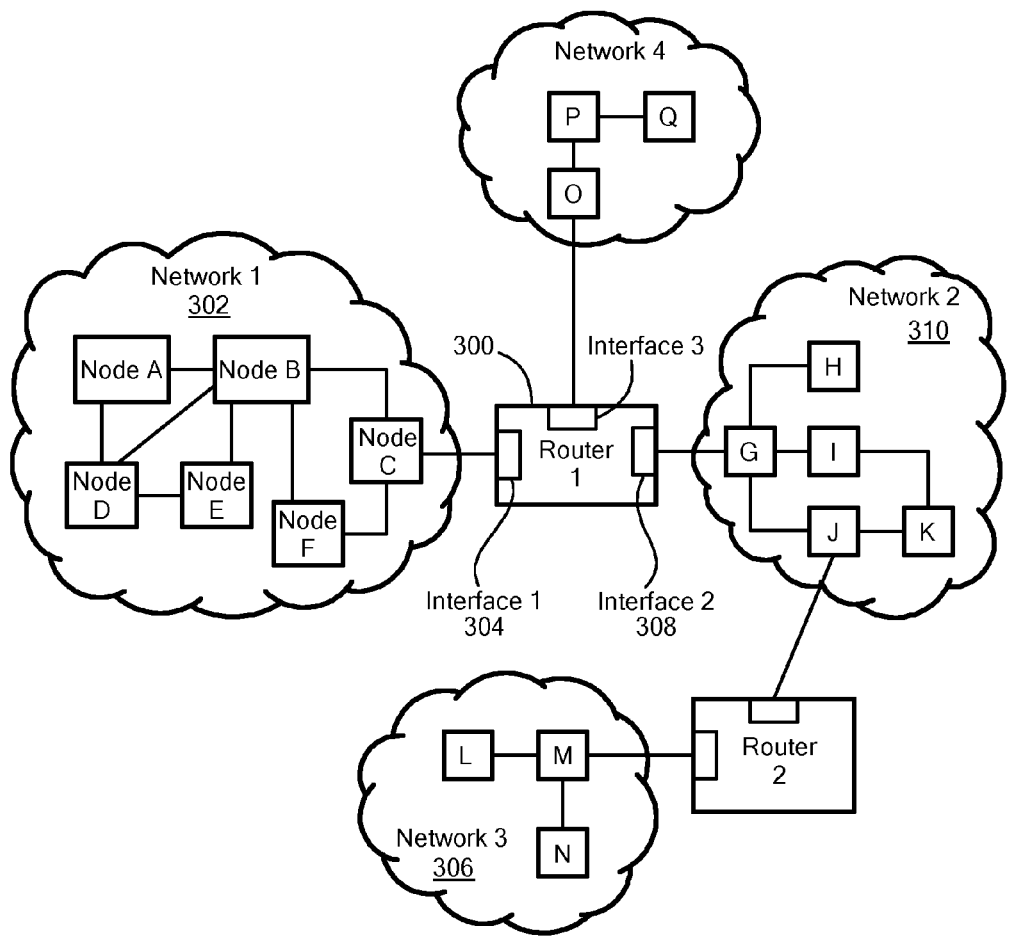
FIG. 3 schematically shows a generic prior art internet that may implement illustrative embodiments of the invention.

A router typically acts as a node that interconnects two or more distinct networks or two or more sub-networks (subnets) of a single network, thereby creating a "network of networks" (i.e., an internet). Thus, a router has at least two interfaces, where each interface connects the router to a different network, as exemplified in FIG. 3. When a router receives a packet via one interface from one network, it uses information stored in its routing table to direct the packet to another network via another interface. The routing table contains network/next hop associations. These associations tell the router that a particular destination can optimally be reached by sending the packet to a specific router that represents a next hop on the way to the final destination. For example, if Router 1 300 receives a packet, via its Interface 1 304, from Network 1 302, and the packet is destined to a node in Network 3 306, the Router 1 300 consults its router table and then forwards the packet via its Interface 2 308 to Network 2 310. Network 2 310 will then forward the packet to Network 3 306. The next hop association can also be indicated in the routing table as an outgoing (exit) interface to the final destination.

Large organizations, such as large corporations, commercial data centers and telecommunications providers, often employ sets of routers in hierarchies to carry internal traffic. For example, one or more gateway routers may interconnect each organization's network to one or more Internet service providers (ISPs). ISPs also employ routers in hierarchies to carry traffic between their customers' gateways, to interconnect with other ISPs, and to interconnect with core routers in the Internet backbone.

A router is considered a Layer 3 device because its primary forwarding decision is based on the information in the Layer 3 IP packet—specifically the destination IP address. A conventional router does not look into the actual data contents (i.e., the encapsulated payload) that the packet carries. Instead, the router only looks at the Layer 3 addresses to make a forwarding decision, plus optionally other information in the header for hints, such as quality of service (QoS) requirements. Once a packet is forwarded, a conventional router does not retain historical information about the packet, although the forwarding action may be collected to generate statistical data if the router is so configured.

Accordingly, an IP network is considered to be "stateless" because, among other things, it does not maintain this historical information. For example, an IP network generally treats each request as an independent transaction that is unrelated to any previous request. A router thus may route a packet regardless of how it processed a prior packet. As such, an IP network typically does not store session information or the status of incoming communications partners. For example, if a part of the network becomes disabled mid-transaction, there is no need to reallocate resources or otherwise fix the state of the network. Instead, packets may be routed along other nodes in the network.

As noted, when a router receives a packet via one interface from one network, the router uses its routing table to direct the packet to another network. Table 1 lists information typically found in a basic IP routing table.

TABLE 1

| | |
|---|---|
| Destination | Partial IP address (Expressed as a bit-mask) or Complete IP address of a packet's final destination |
| Next hop | IP address to which the packet should be forwarded on its way to the final destination |
| Interface | Outgoing network interface to use to forward the packet |
| Cost/Metric | Cost of this path, relative to costs of other possible paths |
| Routes | Information about subnets, including how to reach subnets that are not directly attached to the router, via one or more hops; default routes to use for certain types of traffic or when information is lacking |

Routing tables may be filled in manually, such as by a system administrator, or dynamically by the router. The router uses routing protocols to exchange information with other routers and, thereby, dynamically learn about surrounding network or internet topology. For example, routers announce their presence in the network(s), more specifically, the range of IP addresses to which the routers can forward packets. Neighboring routers update their routing tables with this information and broadcast their ability to forward packets to the network(s) of the first router. This information eventually spreads to more distant routers in a network. Dynamic routing allows a router to respond to changes in a network or internet, such as increased network congestion, new routers joining an internet, and router or link failures.

A routing table therefore provides a set of rules for routing packets to their respective destinations. When a packet arrives, a router examines the packet's contents, such as its destination address, and finds the best matching rule in the routing table. The rule essentially tells the router which interface to use to forward the packet and the IP address of a node to which the packet is forwarded on its way to its final destination IP address.

With hop-by-hop routing, each routing table lists, for all reachable destinations, the address of the next node along a path to that destination, i.e., the next hop. Assuming that the routing tables are consistent, a simple algorithm of each router relaying packets to their destinations' respective next hop suffices to deliver packets anywhere in a network. Hop-by-hop is a fundamental characteristic of the IP Internetwork Layer and the OSI Network Layer.

Thus, each router's routing table typically merely contains information sufficient to forward a packet to another router that is "closer" to the packet's destination, without a guarantee of the packet ever being delivered to its destination. In a sense, a packet finds its way to its destination by visiting a series of routers and, at each router, using then-current rules to decide which router to visit next, with the hope that at least most packets ultimately reach their destinations.

Note that the rules may change between two successive hops of a packet or between two successive packets of a message, such as if a router becomes congested or a link fails. Two packets of a message may, therefore, follow different paths and even arrive out of order. In other words, when a packet is sent by a source or originating node, as a stateless network, there conventionally is no predetermined path the packet will take between the source node and the packet's destination. Instead, the path typically is dynamically determined as the packet traverses the various routers. This may be referred to as "natural routing," i.e., a path is determined dynamically as the packet traverses the internet.

Although natural routing has performed well for many years, natural routing has shortcomings. For example, because each packet of a session may travel along a different path and traverse a different set of routers, it is difficult to collect metrics for the session. Security functions that may be applicable to packets of the session must be widely distributed or risk not being applied to all the packets. Furthermore, attacks on the session may be mounted from many places.

It should be noted that conventionally, packets sent by the destination node back to the source node may follow different paths than the packets from the source node to the destination node.

In many situations, a client computer node ("client") establishes a session with a server computer node ("server"), and the client and server exchange packets within the session. For example, a client executing a browser may establish a session with a web server using a conventional process. The client may send one or more packets to request a web page, and the web server may respond with one or more packets containing contents of the web page. In some types of sessions, this back-and-forth exchange of packets may continue for several cycles. In some types of sessions, packets may be sent asynchronously between the two nodes. As discussed below, this handshake may be performed to provide a secure session over the Internet using well known protocols such as the Secure Sockets Layer Protocol ("SSL") or the Transport Layer Security Protocol ("TLS").

A session has its conventional meaning; namely, it is a plurality of packets sent by one node to another node, where all the packets are related, according to a protocol. A session may be thought of as including a lead (or initial) packet that begins the session, and one or more subsequent packets of the session. A session has a definite beginning and a definite end. For example, a TCP session is initiated by a SYN packet. In some cases, the end may be defined by a prescribed packet or series of packets. For example, a TCP session may be ended with a FIN exchange or an RST. In other cases, the end may be defined by lack of communication between the nodes for at least a predetermined amount of time (a timeout time). For example, a TCP session may be ended after a defined timeout period. Some sessions include only packets sent from one node to the other node. Other sessions include response packets, as in the web client/server interaction example. A session may include any number of cycles of back-and-forth communication, or asynchronous communication, according to the protocol, but all packets of a session are exchanged between the same client/server pair of nodes. A session is also referred to herein as a series of packets.

A computer having a single IP address may provide several services, such as web services, e-mail services and file transfer (FTP) services. Each service is typically assigned a port number in the range 0-65,535 that is unique on the computer. A service is, therefore, defined by a combination of the node's IP address and the service's port number. Note that this combination is unique within the network the computer is connected to, and it is often unique within an internet. Similarly, a single node may execute many clients. Therefore, a client that makes a request to a service is assigned a unique port number on the client's node, so return packets from the service can be uniquely addressed to the client that made the request.

The term socket means an IP address-port number combination. Thus, each service has a network-unique, and often internet-unique, service socket, and a client making a request of a service is assigned a network-unique, and sometimes internet-unique, client socket. In places, the terms source client and destination service are used when referring to a client that sends packets to make requests of a service and the service being requested, respectively.

Network Security and Control

Figure 4:
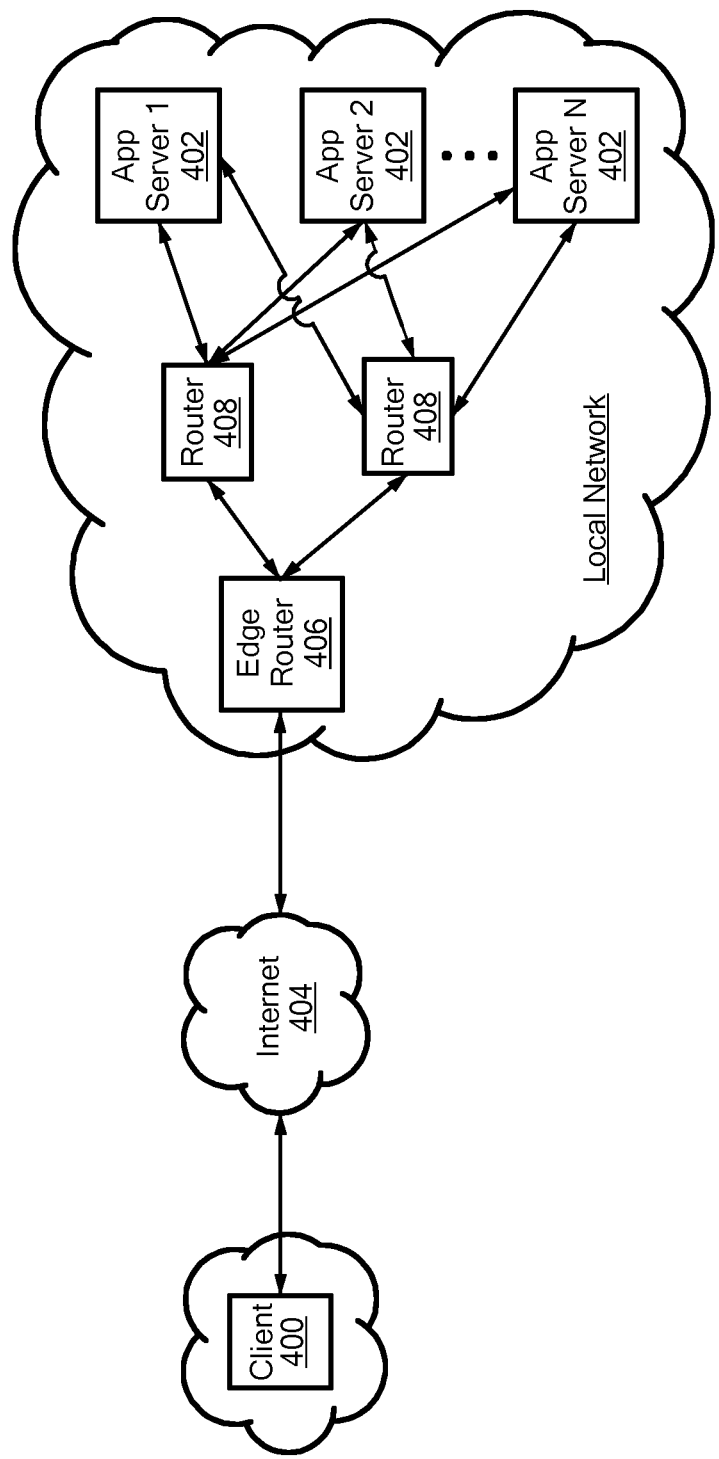
FIG. 4 schematically shows a more specific internet that may implement illustrative embodiments of the invention.

As noted above, hackers often attempt to gain unapproved access to nodes in a network. In fact, some hackers with legitimate access to a network may have more autonomy to manipulate network devices than intended. Such authorized cases can have catastrophic consequences. FIG. 4 schematically shows a more specific type of network in which a hacker can attempt to gain access to nodes in a local network. As shown, the network includes a client node/device 400 (referred to simply as "client 400"), such as a client computer, attempting to access one of a plurality of application servers (generally identified as "application server(s) 402") in a local network across the Internet 404. For exemplary purposes, the local network is a local area network within a conventional data center. Of course, those in the art should understand that discussion of a data center and application servers 402 is by example only and other topologies or other network arrangements may practice illustrative embodiments of the invention.

The local network, or data center in this example, thus has the noted plurality of application servers 402 that serve information to remote nodes/network devices, such as the client 400. In this example, the data center has "N" application servers 402, which can represent dozens, hundreds, or thousands of actual and/or virtual servers. Among other things, the application servers 402 can function as the web servers for various retail stores, Internet services, social media sites, application service providers, etc.

The data center in this embodiment is configured to have one or more edge nodes (referred to herein in this example as an "edge router 406") to receive and forward data between remote nodes (e.g., the client 400) and the nodes in the data center. In other words, the edge router 406 manages data traffic between the local network and remote devices on the Internet 404 or other nearby networks (e.g., forming a wide area network).

To that end, the local network also has a plurality of additional nodes/network devices, such as routers and switches (generally referred to herein as "routers 408"), to receive and forward network traffic within the data center. In illustrative embodiments, the edge router 406 and other local network routers 408 transmit packets to/from the edge router 406 and application servers 402 using Layer 3 protocols, such as the IP protocol. It should be noted that although the edge router 406 often has a direct physical link to the Internet 404 and its Internet Service Provider (ISP), some embodiments may physically position other devices between it and the Internet 404.

Figure 5:
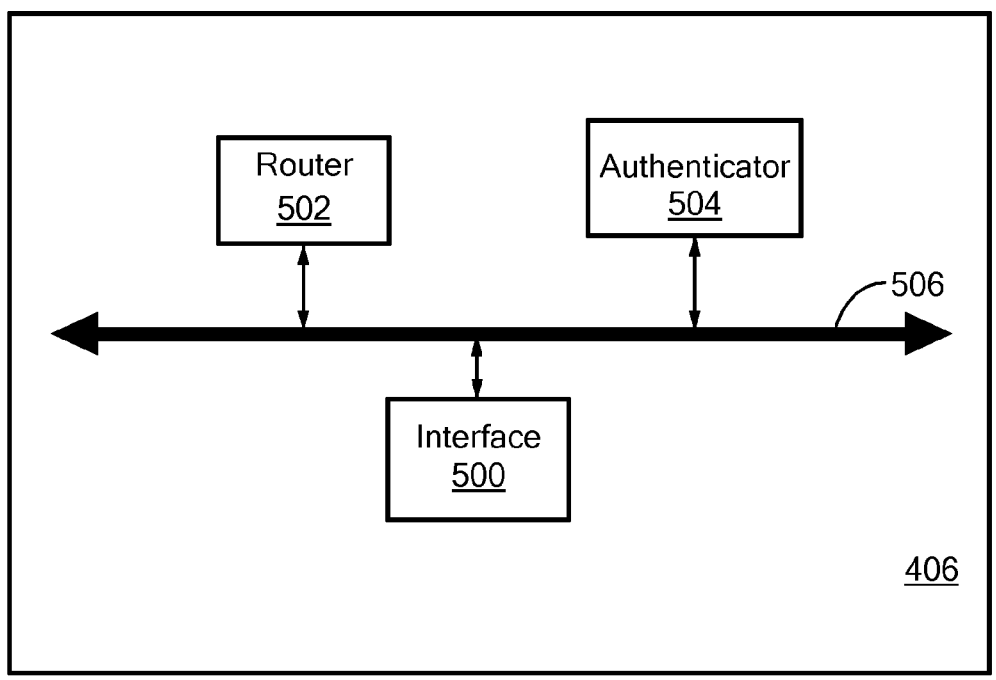
FIG. 5 schematically shows several portions of an edge router configured in accordance with illustrative embodiments of the invention.

FIG. 5 schematically shows the edge router 406 and some of its internal components for managing traffic to and from the network. As shown, the edge router 406 has an interface 500 for connecting with other network devices, such as the routers 408 within its own data center, and devices outside of its local network for, such as those on the Internet 404 (e.g., the client 400). The interface 500 may include one or more physical or virtual interfaces for receiving, transmitting, or both receiving and transmitting data packets.

In a corresponding manner, the edge router 406 also has a local routing apparatus (referred to herein simply as a "router 502") for routing data packets in the prescribed manner specified by various embodiments of the invention. Specifically, as discussed in greater detail below with regard to FIG. 6, the router 502 controls the routing of data packets as a function of client information, which is within the client's digital certificate. Indeed, as described below, various embodiments do not route client data packets unless the client 400 is properly authenticated. Accordingly, the edge router 406 also has an authenticator 504 for verifying the identity of the client 400. Illustrative embodiments may implement the router 502, authenticator 504, and interface(s) 500 in any of a variety of ways known in the art, such as with hardware, software, firmware, or other means known in the art. Of course, their implementation should be consistent with their desired functions, such as the implementations discussed below with regard to FIG. 6.

Each of these edge router components may be interconnected in any of a variety of ways those skilled in the art deem appropriate. FIG. 5 schematically shows such connections as a simple bus identified by reference number 506. Of course, those skilled in the art should recognize that various implementations of the edge router 406 are not limited to a similar bus design.

Figure 6:
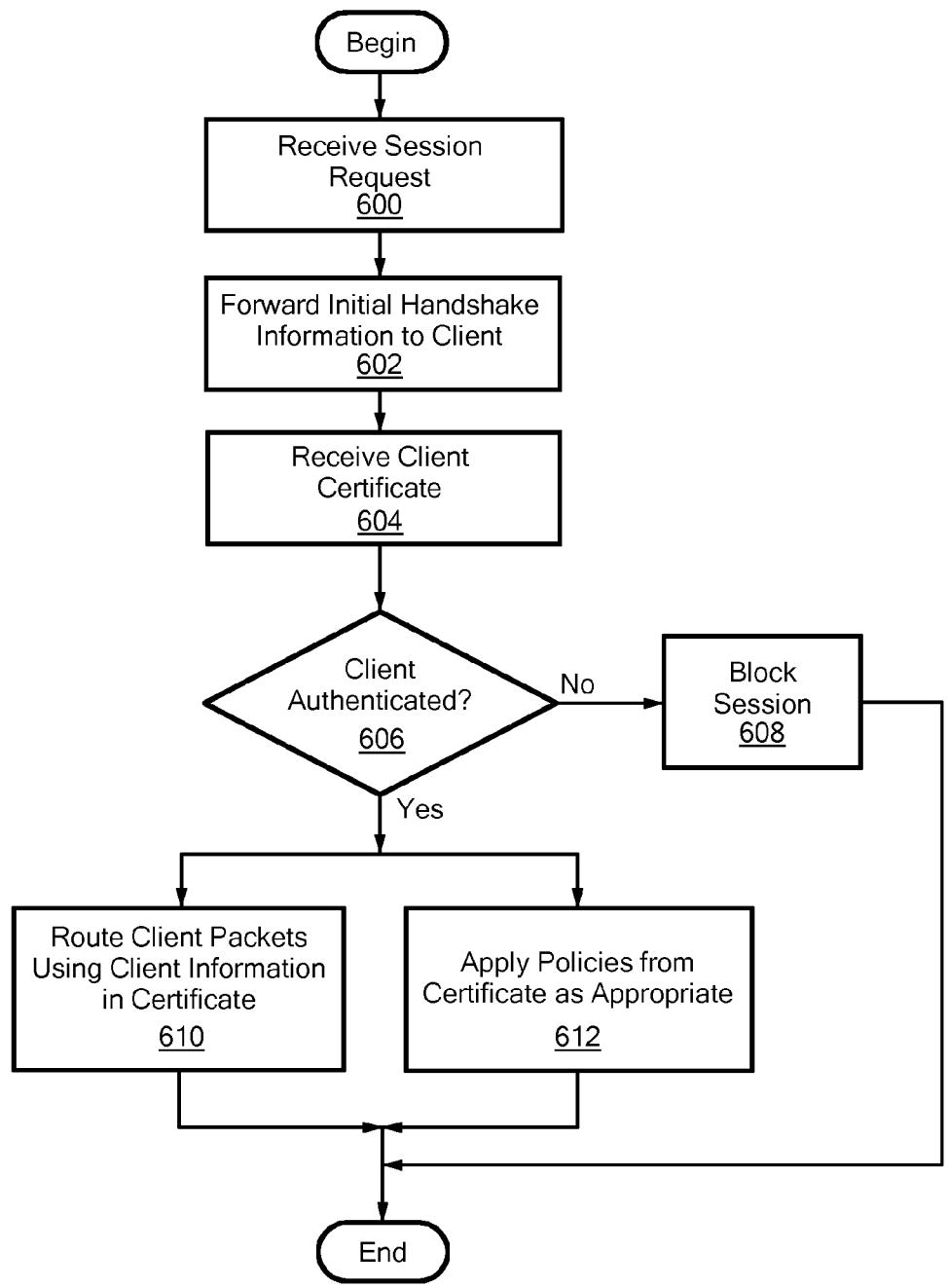
FIG. 6 shows a process of accessing a server in accordance with illustrative embodiments of the invention.

As noted above, hackers may attempt to access the application servers 402 in the data center. These hackers can originate outside of the local network, or from within the network (e.g., using guest access, such as using a login and password). As noted, either legally or illegally, some hackers may obtain privileges that enable a secure connection to the application servers 402, which can then be exploited. Absent robust security measures, such hackers can cause substantial problems. Illustrative embodiments mitigate that risk by imposing further restrictions on authenticated clients 400 attempting to access any of the application servers 402. To that end, FIG. 6 shows a process of providing such security measures in accordance with illustrative embodiments of the invention. It should be noted that this process is substantially simplified from a longer process that normally would be used to access the server(s). Accordingly, the process has many other steps, such as further verification steps, that those skilled in the art likely would use. In addition, some of the steps may be performed in a different order than that shown, or at the same time. Those skilled in the art therefore can modify the process as appropriate.

FIG. 6 describes various embodiments as using the well-known transfer layer security protocol ("TLS"). In fact, the process of FIG. 6 incorporates much of the TLS handshake mutual authentication processes widely in use today. Of course, those skilled in the art should understand that discussion of TLS is by example only and not intended to limit all embodiments of the invention. Accordingly, illustrative embodiments apply to other known security and cryptographic protocols configured to provide a secure connection across a network, such as the Internet 404.

The process begins at step 600, in which the edge router 406 receives the well-known "hello" message from the client 400. This message therefore comes with a variety of data, such as the SSL version, supported ciphers, session specific data, etc. The edge router 406 responds to the client 400 with its own "hello" message, which sends similar data to the client 400 (step 602). For example, in addition to sending the client 400 the SSL version, supported ciphers, session specific data, etc., this hello message also includes the server certificate, a mutual authentication request (effectively requesting the client certificate), and optionally a key exchange. At this point, authentication begins, thus concluding what is considered the initial handshake process.

After receiving the hello message from the edge router 406, the client 400 forwards more data back to the edge router 406, such as the client certificate (step 604). As specified by TLS, this client certificate preferably first is sent in "clear" format (i.e., not encrypted). At this point the process, the edge router 406 may be considered to have initially authenticated/verified the client certificate. If authenticated/verified, then the authentication process continues. If not authenticated/verified, then the process may conclude by blocking all transmission from the client 400.

If verified to this point, then the authenticator 504 continues the handshake process in a conventional manner as specified by TLS. For example, after a client key exchange (pre-master secret for the session, encrypted with the server public key), the client 400 next may sends its Client Certificate Verify message ("CCV") to prove to the edge router 406 that the client 400 owns the private key corresponding to the public key in the client certificate. To that end, the client 400 generates CCV message by hashing all the TLS handshake messages sent or received between the two devices, starting at the client hello and up to, but not including, the CCV message.

The edge router 406 verifies the signature of the CCV message by using the public key to recalculate the hash over the same set of hello messages. As known by those skilled in the art, this is possible because the private key is the only key that can generate the signature that can be verified with a corresponding public key.

At this point in the process, the data packets from the client 400 have not passed through the edge router 406 to any other devices or nodes in the local network. In this case, the edge router 406 preferably acts as the intermediary for any packets from this client 400. For example, the edge router 406 may have a static TLS connection with the application server(s) 402. As such, no data packets can pass to the application servers 402, via the TLS connection, until authenticated and routed as specified.

Other embodiments, however, may have forwarded one or more limited packets from the client 400, such as the hello message. This of course depends upon the flow of the authentication process. For example, after receiving the clear client certificate, the edge router 406 may initially verify the client certificate (e.g., confirm the signature, among other things) and pass along the hello message to one or more of the application servers 402. In this embodiment, the edge router 406 nevertheless will not route a significant number of data packets from the client 400 until the final verification authentication step (e.g., after the key exchange and the Client Certificate Verify processes).

After completing the authentication process, the final handshake process can conclude. Specifically, the process determines if the authenticator 504 authenticated the client 400 (step 606). If the authenticator 504 cannot authenticate the client 400, then, in this session, the edge router 406 blocks subsequent data packets from passing through its interface 500 to any other devices in the data center (step 608).

Conversely, if the authenticator 504 successfully authenticates the client 400, then the process continues to steps 610 and 612. Specifically, at step 610, the edge router 406 routes client data packets using information in the client certificate, and, at step 612, the receiving node/application server 402 applies policies from the client certificate as appropriate.

Specifically, prior to requesting the session, an entity associated with the local network, together with a certificate authority, issue the client certificate to the client 400. FIGS. 7A and 7B schematically show an example of a client certificate configured in accordance with illustrative embodiments of the invention. The certificate has much of the same well-known information as in conventional certificates complying with the requisite standard, such as the widely-used X.509 standard. For example, among other things, certificate has a version number, serial number, the algorithm ID, the name of the issuer, the validity dates, and subject public key information.

Unlike other certificates used for these purposes, however, this client certificate also has additional client information for routing client data packets within the local network. In particular, as shown in FIG. 7A, the client certificate has a subject line identifying details of the client 400 and the person authorized to control the client 400. It should be noted that although FIG. 7A explicitly underlines the subject line, many implementations are not expected to underline this information. Instead, FIG. 7A underlines this line for emphasis only. FIG. 7B similarly underlines text for emphasis purposes only (policy information, discussed below).

Among other things, the subject line in this example includes the country, state, and office name of the client 400, as well as the official unit, name, and e-mail address of a specific user. In this case, the user is John Smith, who has an e-mail address of smith@128technology.com. Mr. Smith is in the office of 128 Technology in Massachusetts in the USA, and is in the Engineering Department. This subject information may be referred to herein as "identifying information," which identifies the client node 400 and the person authorized to use the client node 400. Indeed, those skilled in the art could include more or less identifying information, or different information. For example, the identification information also or alternatively may include city or town information, zip code information, telephone information, more than one person, more than one office or department, the type of client devices (e.g., a tablet, a personal computer, a router, etc.), or other type of information useful for the particular application.

Step 610 preferably uses this identification information to route client packets within the local network. For example, a client 400 having this identification information profile may have access to Application Server 2 only—and thus, no access to other application servers 402 in the local network. Accordingly, the router 502 of the edge router 406 will forward/route data packets from the client 400 to Application Server 2 and no other application server 402. As another example, a client 400 having this identification information profile may have access to Application Servers 1 and 2 only, or all but one application server 402 the local network. As yet another example, the client 400 may have access to all the application servers 402 on the network.

The access permitted to the client 400 is discretionary. For example, the data center may have separate access agreements with hundreds, thousands, or millions of clients 400. A network administrator or other similar functionary can program the edge router 406 to apply access routing for each particular client 400.

In illustrative embodiments, the client certificate is specific to a virtual or actual device. Accordingly, in that instance, a single user may have different access rights to different application servers 402 depending upon the machine that the user uses to initiate the session. Mr. John Smith, for example, may have access rights to one application server 402 (e.g., Application Server 1) in the local network when using his laptop computer, and different access rights to another application server 402 (e.g., Application Server 2) in the local network when using his desktop computer. Other embodiments, however, do not have such a requirement.

The certificate also may have other types of client information for further functionality, or to augment the prior noted routing and/or verification functionality. In this case, the client certificate also has policy information that enables the client 400 to have a prescribed set of privileges when accessing the node(s) in the local network. Specifically, in this example, FIG. 7B shows this policy information as "X.509v3 Certificate Policies:" and lists to policies; namely Policy 1.2.3.4.5 and Policy 1.2.3.4.6.

Logic in the local network (e.g., at the application servers 402) translates these enumerated policies into certain rights for the client 400. These policies may be enforced/implemented in any number of ways. Specifically, in some embodiments, the policies are forwarded to the application servers 402 with the initial data packets (after authentication). Logic in the receiving application server 402 thus reads and implements the policy for the given client 400.

Those skilled in the art may use the policy lines of the certificate for a wide range of different uses. For example, the first policy may specify that this client 400 can access only the engineering schematics section of Application Server 1, while the second policy may specify that this client 400 can access the engineering schematics of only one set of customers of 128 Technology.

As another example, the application server 402 may be a large grocery chain, and the client 400 may be a produce vendor servicing the grocery chain. In that case, the first policy may specify that the produce vendor can access only the produce section of their application server 402, while the second policy may indicate that this particular client 400 only can access data relating to projected produce sales. Accordingly, this client 400 cannot access vendor data for other produce vendors of the grocery store, customer lists, internal grocery chain accounting department information, etc. No further rights are anticipated or permitted. Those skilled in the art may specify any of a wide variety of permissions/policies and thus, those discussed above are merely illustrative of various embodiments. A network administrator or other functionary within the local network can set, modify, and terminate policies as needed. Moreover, the certificate can have fewer than two policies (e.g., zero or one), or as many policies as deemed necessary.

In alternative embodiments, the authenticator 504 may deviate from typical authentication processes to use the client information as part of the authentication process. Similarly, some embodiments may use both identification information and policy information to specify where the edge router 406 is to route the data packets of the client 400. For example, the policy information may specify that between 8 am and 5 pm, Application Server 1 can receive packets from the client 400, while during other hours, Application Server 2 can receive the packets from the client 400.

Still some embodiments may use the policy information alone to route the to the application servers 402—i.e., the policy information may inherently have the routing information. For example, the first policy may specify precisely the exact application server 402 that this client 400 may access, such as Application Server 1.

Those skilled in the art recognize that this routing and policy application occurs at the network level. Various embodiments further more maintain higher level security measures (e.g., on the application level), such as requiring a login identification and password for access at some point in the process. Other embodiments, however, do not require such steps.

The client certificate may be installed in any of a variety of conventional manners. For example, the client certificates may be installed on an iOS device over the air using configuration profiles and Mobile Device Management (MDM) capability of iOS devices. Additionally, the client certificate may be installed on iOS devices by sending the PKCS12 version of the certificate as an email attachment. The client certificate may be installed on Android devices manually by sending the PKCS12 version of the client certificate as an email attachment, or though Android specific Mobile Management products. Indeed, these installation methods are illustrative and not intended to limit various embodiments. Those skilled in the art may use other methods to install the client certificates.

The local network may log each attempt to access nodes in the local network. Accordingly, the system can maintain stateful information—records of all attempts, identities, and other relevant data. This system should be particularly effective when used with systems using state information in a stateless packet based system, such as those described in the above referenced incorporated patent applications. Those systems thus may integrate with illustrative embodiments to more effectively maintain the local network, and control network access.

Illustrative embodiments also apply to devices/users accessing the local network through a guest interface ("Guest Users"). Specifically, many guest interfaces implementing the 802.1X protocol to connection with the local network using a wired or wireless connection. The authentication may follow any of a variety of such protocols, such as EAP-TLS, or EAP-TTS. One widely used access technique known in the art provides the Guest User with a login ID and password information. For example, the local network may provide the Guest User with the login ID, "Guest" and a password "NetworkX." The Guest User thus simply logs into the local network via a simple interface requesting the login ID and password. Absent security measures, the guest then can have wide access to the resources on the network.

Illustrative embodiments control this by providing security at the network level. In this case, as with the other embodiments discussed above, the local network or other body grants a specific guest certificate, such as that discussed above and shown in FIGS. 7A and 7B to the Guest User. As noted, this guest certificate has information specific to the Guest User and effectively limits the Guest User's access and use of the local network. More specifically, in illustrative embodiments, the guest certificate also has one or more a subject line identifying details of the Guest User, and policy information that enables the Guest User to have a prescribed set of privileges when accessing the node(s) in the local network. Accordingly, like the client 400 discussed above, the Guest User's access is limited by these two fields—both with device access and policies.

Illustrative embodiments also associate the MAC address (i.e., used as a client device identifier) of the Guest User's device with the certificate. Accordingly, after the Guest User logs onto the local network, the edge router 406 or similar node maintains a record of the guest certificate and the MAC address of the Guest User's device. Specifically, in some embodiments, edge router 406 may obtain the MAC address from the Layer 2 header of specified packet(s) of the Guest User (e.g., the first such packet).

When the Guest User logs off the local network and subsequently logs back on, the edge router 406 or similar node may compare the MAC address of the device attempting access and the certificate with those stored in its local memory. If they match, then the edge router 406 permits further access. If, however, they do not match, then the edge router 406 prevents further network access. In that latter case, the Guest User may be required to obtain a new login ID and password, or register the new device with a new guest certificate or the original guest certificate.

Accordingly, in this embodiment, in addition to controlling the Guest User's use and access to the local network, the guest certificate helps authenticate the Guest User accessing and initiating a session with the local network. In other words, the guest certificate further ensures that the Guest User is a valid guest. Indeed, this and other embodiments apply to other types of users accessing the local network. Accordingly, various embodiments are not limited to the discussed modes of accessing the local network.

Accordingly, various embodiments enhance detection techniques for credential based attacks and mitigate their impact (ideally stopping such attacks). When implemented by the edge router 406, such attacks can be mitigated or stopped at an earlier point in the network (e.g., before the packets reach the application server 402). Accordingly, such embodiments can check and enforce client/user credentials at the network level and proactively stop invalid login attempts. In addition to protecting the application servers 402, various embodiments protect the core network form attacks while significantly reducing core network traffic.

Various embodiments of the invention may be implemented at least in part in any conventional computer programming language. For example, some embodiments may be implemented in a procedural programming language (e.g., "C"), or in an object oriented programming language (e.g., "C++"). Other embodiments of the invention may be implemented as a pre-configured, stand-along hardware element and/or as preprogrammed hardware elements (e.g., application specific integrated circuits, FPGAs, and digital signal processors), or other related components.

In an alternative embodiment, the disclosed apparatus and methods (e.g., see the various flow charts described above) may be implemented as a computer program product for use with a computer system. Such implementation may include a series of computer instructions fixed either on a tangible, non-transitory medium, such as a computer readable medium (e.g., a diskette, CD-ROM, ROM, or fixed disk). The series of computer instructions can embody all or part of the functionality previously described herein with respect to the system.

Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies.

Among other ways, such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). In fact, some embodiments may be implemented in a software-as-a-service model ("SAAS") or cloud computing model. Of course, some embodiments of the invention may be implemented as a combination of both software (e.g., a computer program product) and hardware. Still other embodiments of the invention are implemented as entirely hardware, or entirely software.

Although the above discussion discloses various exemplary embodiments of the invention, it should be apparent that those skilled in the art can make various modifications that will achieve some of the advantages of the invention without departing from the true scope of the invention.

What is claimed is:

1. A method of routing data across a network, the method comprising:
    receiving, at an edge router, a session request from a client node to access, during a session, a server node in a local network, the local network comprising a plurality of nodes other than the client node, the edge router being coupled between the client node and the local network;
    receiving, by the edge router, a client certificate from the client node, the client certificate having client information comprising a public key of the client node and specifying the server node;
    receiving, by the edge router, from the client node, a signature encrypted according to a private key of the client node;
    executing an authentication process using the client certificate, wherein the authentication process includes using the public key to verify the signature;
    retrieving the client information from the client certificate;
    maintaining a static connection between the edge router and the server node; and
    receiving, by the edge router, data packets from the client node and, when the authentication process authenticates the client node, routing, by the edge router, the data packets to the server node specified by the client information in the client certificate, such that all data packets of the session received by the server node flow through the edge router, wherein routing the data packets to the server node comprises routing the data packets along the static connection.

2. The method as defined by claim 1 further comprising rejecting the client node when the authentication process does not authenticate the client node.

3. The method as defined by claim 2 wherein rejecting comprises blocking packets of the client node from access to the plurality of nodes in the local network.

4. The method as defined by claim 1 wherein the client information comprises identifying information identifying the client node.

5. The method as defined by claim 1 wherein routing data packets comprises:
    using the client information to determine the identity of the server node in the local network to receive the data packets from the client node; and
    routing data packets from the client node to the identified server node.

6. The method as defined by claim 5 wherein routing permits access to the server node by the client node when authenticated, the client information including policy information for enabling a set of privileges for the client node when accessing the server node.

7. The method as defined by claim 1 wherein the client information includes a) identifying information identifying the client node, b) policy information for enabling a set of privileges for the client node when accessing the server node, or c) both (a) and (b).

8. The method as defined by claim 7 wherein routing data packets comprises routing data packets as specified by one or both identifying information and the policy information.

9. The method as defined by claim 1 wherein the server node comprises an application server and the local network includes a local area network.

10. The method as defined by claim 1 wherein handshake processes are not performed between the client node and the server node during the session.

11. The method as defined by claim 1 wherein executing an authentication process comprises receiving a login ID and password for a guest user, and confirming the login ID and password are valid for access in the local network.

12. The method as defined by claim 11 further comprising determining a client device identifier that identifies the client node device, and using the client device identifier and the client certificate to execute the authentication process.

13. The method as defined by claim 12 wherein the client device identifier comprises a MAC address.

14. The method as defined by claim 1, further comprising:
    facilitating at least limited access to the server node based on the client information in the client certificate.

15. The method as defined by claim 14 wherein the client information includes policy information.

16. The method as defined by claim 15 wherein the server node has an associated set of access privileges, facilitating at least limited access comprising permitting the client node at least one of the associated set of access privileges.

17. A network routing device for routing data received across a network, the network device comprising:
    an interface for receiving: a) a session request from a client node to access a server node in a local network, the local network comprising a plurality of nodes other than the client node, the interface being coupled between the client node and the local network, b) a client certificate from the client node, the client certificate having client information comprising a public key of the client node and specifying the server node and c) a signature from the client node, the signature being encrypted according to a private key of the client node;

an authenticator operatively coupled with the interface, the authenticator being configured to retrieve the client certificate and execute an authentication process using the client certificate, wherein the authentication process includes using the public key to verify the signature; and a router operatively coupled with the authenticator, the router being configured to determine, from the authenticator, when the authentication process authenticated the client node, the router further being configured to maintain a static connection between the router and the server node, receive data packets from the client node and route the data packets along the static connection to the server node specified by the client information in the client certificate when the client node is authenticated, such that all data packets of the session received by the server node flow through the router.

18. The network routing device as defined by claim 17 wherein the client information comprises identifying information identifying the client node.

19. The network routing device as defined by claim 17 wherein the router is configured to use the client information to determine the identity of the server node, the router further being configured to route client data packets from the client node to the identified server node.

20. The network routing device as defined by claim 19 wherein the router is configured to permit access to the server node by the client node when authenticated, the client information including policy information for enabling a set of privileges for the client node when accessing the server node.

21. The network routing device as defined by claim 17 wherein the client information includes a) identifying information identifying the client node, b) policy information for enabling a set of privileges for the client node when accessing the server node, or c) both (a) and (b).

22. The network routing device as defined by claim 21 wherein the router is configured to route data packets as specified by one or both identifying information and the policy information.

23. The networking device as defined by claim 17 wherein the router is configured as an edge router for the local network.

24. A computer program product for use on a computer system for routing data across a network, the computer program product comprising a tangible, non-transient computer usable medium having computer readable program code thereon, the computer readable program code comprising:

program code for receiving, at an edge node, a session request from a client node to access, during a session, a server node in a local network, the local network comprising a plurality of nodes other than the client node, the edge router being coupled between the client node and the local network;

program code for receiving, by the edge router, a client certificate from the client node, the client certificate having client information comprising a public key of the client node and specifying the server node;

program code for receiving, by the edge router, from the client node, a signature encrypted according to a private key of the client node;

program code for executing an authentication process using the client certificate, wherein the authentication process includes using the public key to verify the signature;

program code for retrieving the client information from the client certificate;

program code for maintaining a static connection between the edge router and the server node; and program code for receiving, by the edge router, data packets from the client node and, routing the data packets to the server node specified by the client information in the client certificate when the authentication process authenticates the client node, such that all data packets of the session received by the server node flow through the edge router, wherein routing the data packets to the server node comprises routing the data packets along the static connection.

25. The computer program product as defined by claim 24 further comprising program code for rejecting the client node when the authentication process cannot authenticate the client node.

26. The computer program product as defined by claim 25 wherein the program code for rejecting comprises program code for blocking packets of the client node from access to the plurality of nodes in the local network.

27. The computer program product as defined by claim 24 wherein the client information comprises identifying information identifying the client node.

28. The computer program product as defined by claim 24 wherein the program code for routing data packets comprises:

program code for using the client information to determine the identity of the server node; and program code for routing data packets from the client node to the identified server node.

29. The computer program product as defined by claim 28 wherein the program code for routing permits access to the server node by the client node when authenticated, the client information including policy information for enabling a set of privileges for the client node when accessing the server node.

30. The computer program product as defined by claim 24 wherein the client information includes a) identifying information identifying the client node, b) policy information for enabling a set of privileges for the client node when accessing the server node in the local network, or c) both (a) and (b).

31. The computer program product as defined by claim 30 wherein the program code for routing data packets comprises program code for routing data packets as specified by one or both identifying information and the policy information.

32. The computer program product as defined by claim 24 wherein the server node comprises an application server and the local network includes a local area network.

33. The computer program product as defined by claim 24 wherein handshake processes are not performed between the client node and the server node during the session.

34. The computer program product as defined by claim 24 further comprising:

program code for permitting initial handshake processes between the client node and the server node before receiving the certificate; and program code for permitting completion of final handshake processes between the client node and server node when the authentication process authenticates the client node.

35. A method of routing data across a network, the method comprising:

receiving, at an edge router, a session request from a client node to access, during a session, a server node in a local network, the local network comprising a plurality of nodes other than the client node, the edge router being coupled between the client node and the local network;

receiving, by the edge router, a client certificate from the client node, the client certificate having client information comprising a public key of the client node and specifying the server node;

receiving, by the edge router, from the client node, a signature encrypted according to a private key of the client node;

executing an authentication process using the client certificate, wherein the authentication process includes using the public key to verify the signature;

retrieving the client information from the client certificate;

permitting initial handshake processes between the client node and the server node before receiving the client certificate; and receiving, by the edge router, data packets from the client node and, when the authentication process authenticates the client node, permitting completion of final handshake processes between the client node and server node and routing, by the edge router, the data packets to the server node specified by the client information in the client certificate, such that all data packets of the session received by the server node flow through the edge router.

36. The method as defined by claim 35 further comprising rejecting the client node when the authentication process does not authenticate the client node.

37. The method as defined by claim 36 wherein rejecting comprises blocking packets of the client node from access to the plurality of nodes in the local network.

38. The method as defined by claim 35 wherein the client information comprises identifying information identifying the client node.

39. The method as defined by claim 35 wherein routing data packets comprises:

using the client information to determine the identity of the server node in the local network to receive the data packets from the client node; and routing data packets from the client node to the identified server node.

40. The method as defined by claim 39 wherein routing permits access to the server node by the client node when authenticated, the client information including policy information for enabling a set of privileges for the client node when accessing the server node.

41. The method as defined by claim 35 wherein the client information includes a) identifying information identifying the client node, b) policy information for enabling a set of privileges for the client node when accessing the server node, or c) both (a) and (b).

42. The method as defined by claim 41 wherein routing data packets comprises routing data packets as specified by one or both identifying information and the policy information.

43. The method as defined by claim 35 wherein the server node comprises an application server and the local network includes a local area network.

44. The method as defined by claim 35 wherein an edge router receives the session request, the method further comprising maintaining a static connection between the edge router and the server node, routing comprising routing data packets from the client node along the static connection.

45. The method as defined by claim 35 wherein executing an authentication process comprises receiving a login ID and password for a guest user, and confirming the login ID and password are valid for access in the local network.

46. The method as defined by claim 45 further comprising determining a client device identifier that identifies the client node device, and using the client device identifier and the client certificate to execute the authentication process.

47. The method as defined by claim 46 wherein the client device identifier comprises a MAC address.

* * * * *